US011289886B2

(12) United States Patent
Bang-Andreasen

(10) Patent No.: US 11,289,886 B2
(45) Date of Patent: Mar. 29, 2022

(54) QUICK RELEASE CONNECTION FLANGE

(71) Applicant: Balmoral Comtec Limited, Aberdeen (GB)

(72) Inventor: Henrik Bang-Andreasen, Bergen (NO)

(73) Assignee: Balmoral Comtec Limited, Aberdeen (GB)

( * ) Notice: Subject to any disclaimer, the term of this patent is extended or adjusted under 35 U.S.C. 154(b) by 401 days.

(21) Appl. No.: 16/334,223

(22) PCT Filed: Sep. 19, 2017

(86) PCT No.: PCT/EP2017/073604
§ 371 (c)(1),
(2) Date: Mar. 18, 2019

(87) PCT Pub. No.: WO2018/060004
PCT Pub. Date: Apr. 5, 2018

(65) Prior Publication Data
US 2019/0229505 A1  Jul. 25, 2019

Related U.S. Application Data

(60) Provisional application No. 62/400,639, filed on Sep. 28, 2016.

(51) Int. Cl.
*H02G 1/08* (2006.01)
*H02G 1/10* (2006.01)
*E02B 17/00* (2006.01)

(52) U.S. Cl.
CPC ............... *H02G 1/081* (2013.01); *H02G 1/10* (2013.01); *E02B 2017/0095* (2013.01)

(58) Field of Classification Search
CPC ....... B63B 21/10; E21B 17/02; E21B 17/021; E21B 17/03; E21B 17/046;
(Continued)

(56) References Cited

U.S. PATENT DOCUMENTS 2,700,559 A * 1/1955 Jensen .................. F16L 37/096
285/108
3,948,545 A 4/1976 Bonds
(Continued)

FOREIGN PATENT DOCUMENTS

GB 2118657 A 11/1983
GB 2463471 A 3/2010
(Continued)

OTHER PUBLICATIONS

International Search Report and Written Opinion from PCT/EP2017/073604 dated Dec. 1, 2017, 13 pages.
(Continued)

*Primary Examiner* — Tyrone V Hall, Jr.
(74) *Attorney, Agent, or Firm* — SmithAmundsen LLC

(57) ABSTRACT

A quick release cable pull-in system for securing a conduit (28) in which is arranged a cable (38) to the mouth of a J-Tube (12) or other opening in a structure. The system includes a collar (30) with a groove (32) attached to the end of the conduit. A rotatable locking arm (20) releasably engages the collar when a tapered nose (34) cone is pulled into the J-Tube. The rotatable locking arm has a shoulder member (44) that is biased downward into the interior of the cylindrical opening. According to one aspect, the shoulder member is downwardly biased by an elastomeric collar (46. According to another aspect, the shoulder member is downwardly biased by a spring, by magnetic forces or other means.

9 Claims, 10 Drawing Sheets

(58) Field of Classification Search
CPC ....... E21B 17/0465; F16L 35/00; F16L 37/00; F16L 37/002; F16L 37/08; F16L 37/086; F03D 80/85; E02B 2017/0095; H02G 1/00; H02G 1/08; H02G 1/081; H02G 1/088; H02G 1/10
See application file for complete search history.

(56) References Cited

U.S. PATENT DOCUMENTS

| | | | | |
|---|---|---|---|---|
| 5,947,642 | A | * | 9/1999 | Teixeira ................ F16L 37/127 405/195.1 |
| 2014/0212221 | A1 | * | 7/2014 | Routeau .................... F16B 7/22 405/168.1 |

FOREIGN PATENT DOCUMENTS

| | | |
|---|---|---|
| WO | 2005/095198 A1 | 10/2005 |
| WO | 2008/139190 A1 | 11/2008 |

OTHER PUBLICATIONS

International Preliminary Report on Patentability for PCT/EP2017/073604 dated Apr. 2, 2019, 6 pages.

\* cited by examiner

QUICK RELEASE CONNECTION FLANGE

FIELD OF THE INVENTION

The invention relates to cables and flexibles, in particular to methods for pulling and protecting cables such as offshore cables and more particularly to mechanical connections between cables and a structure.

BACKGROUND

Cables, in particular cables used in the offshore industry, can be extremely long and heavy. The cables must often be pulled from one location to another, requiring great pulling forces up to several tons. The cables must often be protected from the environment and physical impacts, and in certain applications cables are arranged concentrically inside a protective conduit that is pulled along with the cable and secured to a structure. An example of such an application is cables stretched between offshore wind turbines, transformer stations and the like. Another example of such an application is flexibles stretched between offshore production platforms.

One method of pulling a cable arranged inside a protective conduit is affixing the cable inside the conduit so that it will not move relative to the conduit. A pulling line can then be attached to just the conduit, and the entire arrangement will follow.

In many applications, however, it is necessary that the cable be freely movable in the longitudinal direction inside the conduit. For example, when a cable is pulled from the foundation of one wind turbine to another, the protective conduit is pulled to, and enters the foundation of the structure, either at an opening at the base of the foundation or through an entry device known in the art such as a J-tube. The internal cable, however, must be pulled further up inside the foundation to a hang-off point, often located in a deck above the water surface.

In such an application, it is desirable that the conduit be secured to the entry point of the foundation, to ensure that the conduit is not pulled back out of the foundation by the weight of the cable arrangement, by currents or other forces. A prior art solution to this problem is disclosed in EP2329174. As shown therein, a lockable pull-in member is arranged at the end of the conduit. The pull-in member comprises a flexible bend restriction section at its leading end, and a locking segment at its trailing end. The flexible bend restriction section is made of a polymer material, while the locking segment is in the form a rigid, cylindrical steel body with an abutment portion at its base that has a larger diameter than the entry hole. The locking segment further comprises a plurality of biased, spring-loaded fingers spaced a distance forward of the abutment portion. The fingers, being biased in the extended position, spring out to engage the inside of the opening to prevent the conduit from being pulled back out of the structure.

As further shown in EP2329174, a single pull-in line connects to both the protective conduit and the internal cable by a weak link arrangement in the form of two separate wire leaders. The wire leaders have different breaking strengths, with the leader attached to the conduit having a lower breaking strength than the leader for the cable. In use, the arrangement is pulled into an opening in a foundation until the abutment portion contacts the foundation wall. The pull line pulls with increasing force until the conduit's wire leader breaks. Subsequently, the cable is pulled up into the foundation using its stronger leader.

An alternative to the weak link arrangement of EP2329174 employing wire leads having different breaking strengths is a "weak link latch" described by the present inventors in application No. 62/347,636, the entire specification and drawings of which are hereby incorporated by references as if reproduced here verbatim. As described therein, the weak link latch comprises an elongated central member having a connection point at a leading end for a pull line and a connection point at a trailing end. Projecting laterally from the central member are two or more arms, at least one of which is rotatable in the direction of the trailing end, from a first, extended lock position to a second, collapsed release position. The arms, when in the extended lock position are arranged to engage with a first pullable object, for example by engaging notches on the object itself or in a connection piece. A connection line connects the connection point at the trailing end of the central member to a second pullable object.

A shear pin having a predetermined breaking strength holds the rotatable arm in the extended lock position. Thus, a single pull line attached to the central member can pull both the first and second objects so long as the break strength of the shear pin is not exceeded. When the first object meets a resistance, for example when it contacts a structure at an intended first location, the pull line may then be pulled with increasing force until the shear pin breaks, which allows the rotatable arm to rotate to the collapsed release position whereby the arms disengage from the first object. The pull line—disengaged weak link—and connection line can thereafter together continue to pull the second object.

SUMMARY OF THE INVENTION

The present invention has as its object to overcome one or more of the disadvantages of the prior art, or to provide an alternate mechanical interface solution between a cable arrangement and a structure. It should be understood that while the invention will be described in the context of an offshore cable disposed within a protective conduit arranged to be introduced through an aperture or hole of the foundation of a wind turbine or through a J-Tube, the invention is also useful for any situation where a flexible member is required to be hung-off (mechanically interlocked to) an apparatus.

According to one aspect, the present invention provides a quick release flange mounted to the mouth of a J-Tube or other opening in a structure. The quick release flange is an essentially cylindrical body having a cylindrical opening. Mounted on the outside surface of the cylindrical body is a rotatable locking arm. The rotatable locking arm has a shoulder member that is biased downward into the interior of the cylindrical opening. According to one aspect, the shoulder member is downwardly biased by an elastomeric collar arranged about the outer circumference of the flange, with the shoulder member underneath and pressed downward by the elastomeric collar. According to another aspect, the shoulder member is downwardly biased by a spring, by magnetic forces or other means.

A conduit in which is arranged a longitudinally extendable cable has, at its leading end, a connection collar having a diameter less than the diameter of the cylindrical opening of the flange. A groove in the connection collar is adapted to receive the downwardly biased shoulder member of the rotatable locking arm in locking engagement when the collar is pulled into the cylindrical opening of the flange.

According to one aspect, the conduit is equipped with a tapered pull-in head. The pull-in head is connected to both the internal cable and the connection collar by a weak link latch. A pull-in line connected to the pull-in head is arranged to pull the pull-in head, together with the collar and conduit, into the J-Tube via the flange opening. The pull-in head is arranged to press the downwardly biased shoulder member upward. When the groove of the connection collar is aligned with the shoulder member, the downward biasing force presses the shoulder member into locking engagement with the groove in the connection collar. The pull-in line can thereafter be pulled with sufficient force to break the shear pin of the weak link latch, thereby disengaging the weak link latch from the connection collar. The pull-in line may thereafter pull the internal cable further into the structure, with the connection collar securely locked in place at the mouth of the J-Tube.

According to another aspect, the quick release flange comprises means for disengaging the connection collar from the flange. The rotatable locking arm may be rotated upward to disengage the shoulder member from the groove in the connection collar. According to one aspect, a release line may be attached to the rotatable locking arm. The release line may extend to above the surface of the water, or to any other desirable location. Pulling the release line will rotate the rotatable locking arm upward, disengaging the shoulder member from the collar. In an alternative arrangement, a release device may be attached to a manipulator arm of an ROV. The release device has a frame with a vertically movable slider member. The slider member has slot for receiving the end of the rotatable locking arm. When the end of the rotatable locking arm is inserted into the slot of the slider member, a hydraulic piston or other actuating means presses the slider member upwards, thereby raising the rotatable locking arm and disengaging the shoulder member from the connection collar.

According to another aspect, the quick release flange of the invention provides a failsafe release mechanism. According to this aspect, the rotatable locking arm is attached to brackets on the outer surface of the flange by a removable hinge pin. The hinge pin is secured to the brackets by a removable or breakable safety pin.

In the event the rotatable locking arm becomes jammed, the hinge pin, preferably equipped with a handle, can be removed, allowing the entire rotatable locking arm and shoulder member to be removed from the flange, thus releasing the connection collar.

BRIEF DESCRIPTION OF THE DRAWINGS

The invention will be described in detail with reference to the following figures, wherein.

DETAILED DESCRIPTION

Figure 1:
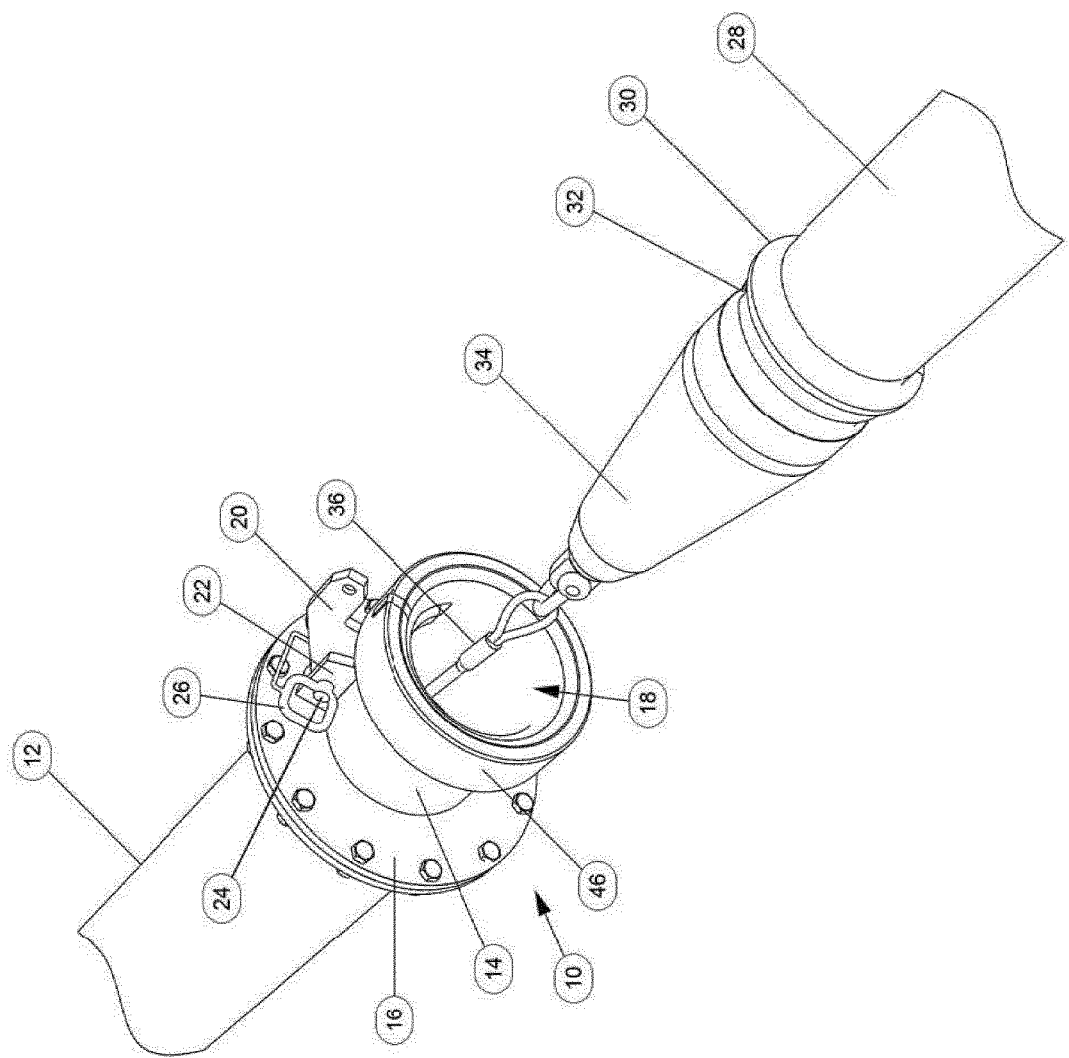
FIG. 1 is a perspective view of an embodiment of the quick release flange of the invention with elastomeric collar biasing the rotatable locking arm, with a pull-in head and connection collar arranged on a conduit.

FIG. 1 shows the quick release flange 10 of the invention mounted to the mouth of a J-Tube 12, for example a J-Tube entry point to an offshore monopole for a wind turbine and the like. It should be understood that the flange could be mounted to any type of opening to a structure. The flange comprises an essentially cylindrical body 14 connected to the J-Tube by a connecting plate 16. The flange has a cylindrical opening 18. A rotatable locking arm 20 is mounted in brackets 22, and rotates about a removable hinge pin 24. Hinge pin 24 is equipped with a handle 26.

Figure 2:
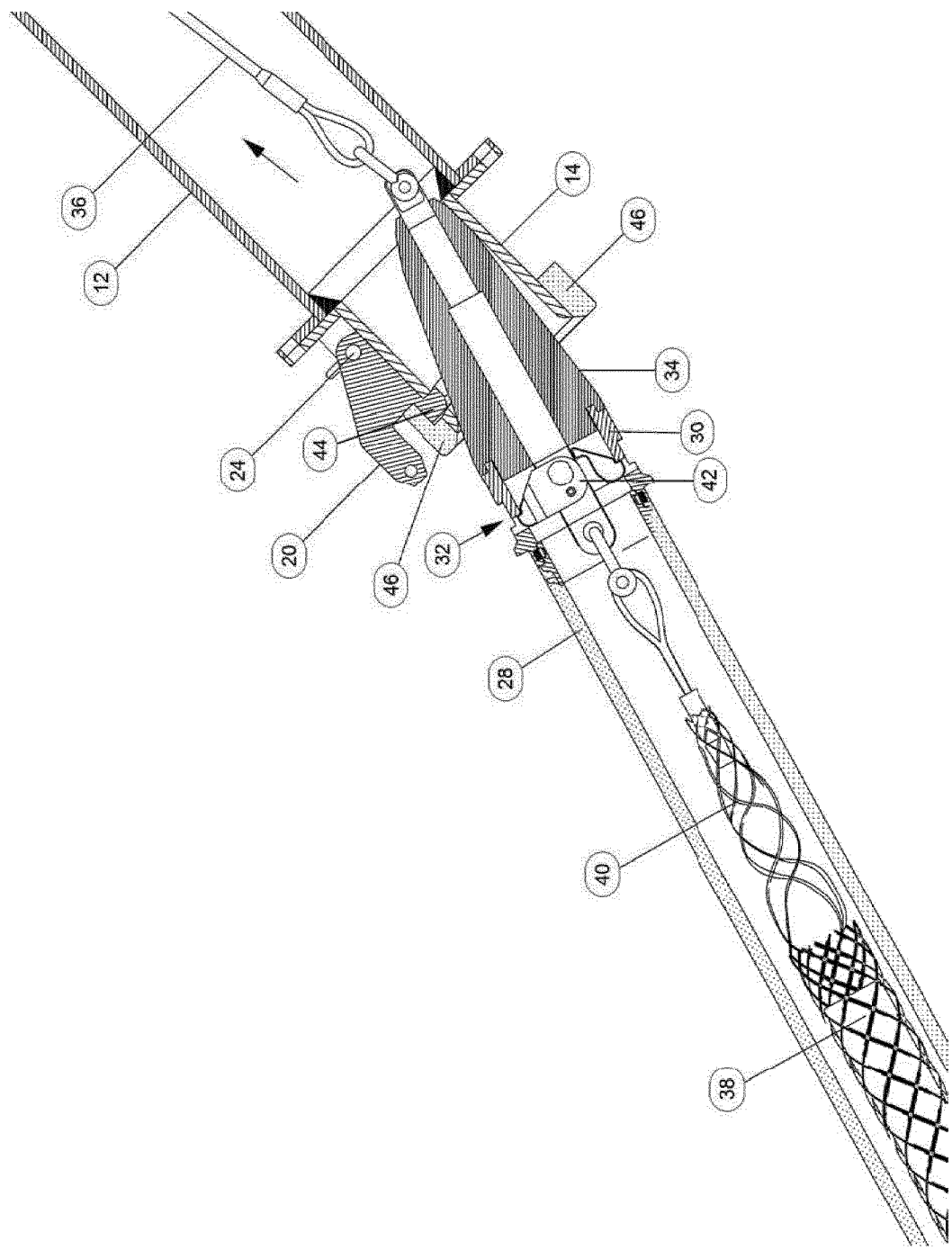
FIG. 2 is the cross sectional view of the pull-in head entering the flange.

FIG. 1 further shows a flexible conduit 28, at the leading end of which is mounted a connection collar 30. Connection collar 30 has a groove 32. A tapered pull-in head 34 is connected to the connection collar 30 by a weak link attachment, and is pulled into the J-Tube by a pull-in wire 36. As shown in FIG. 2, a longitudinally extendable cable 38 is disposed within conduit 28, and held by a cable gripping device 40 known in the art. Pulling head 34 is connected to connection collar 30 by a weak link latch 42.

Figure 3:
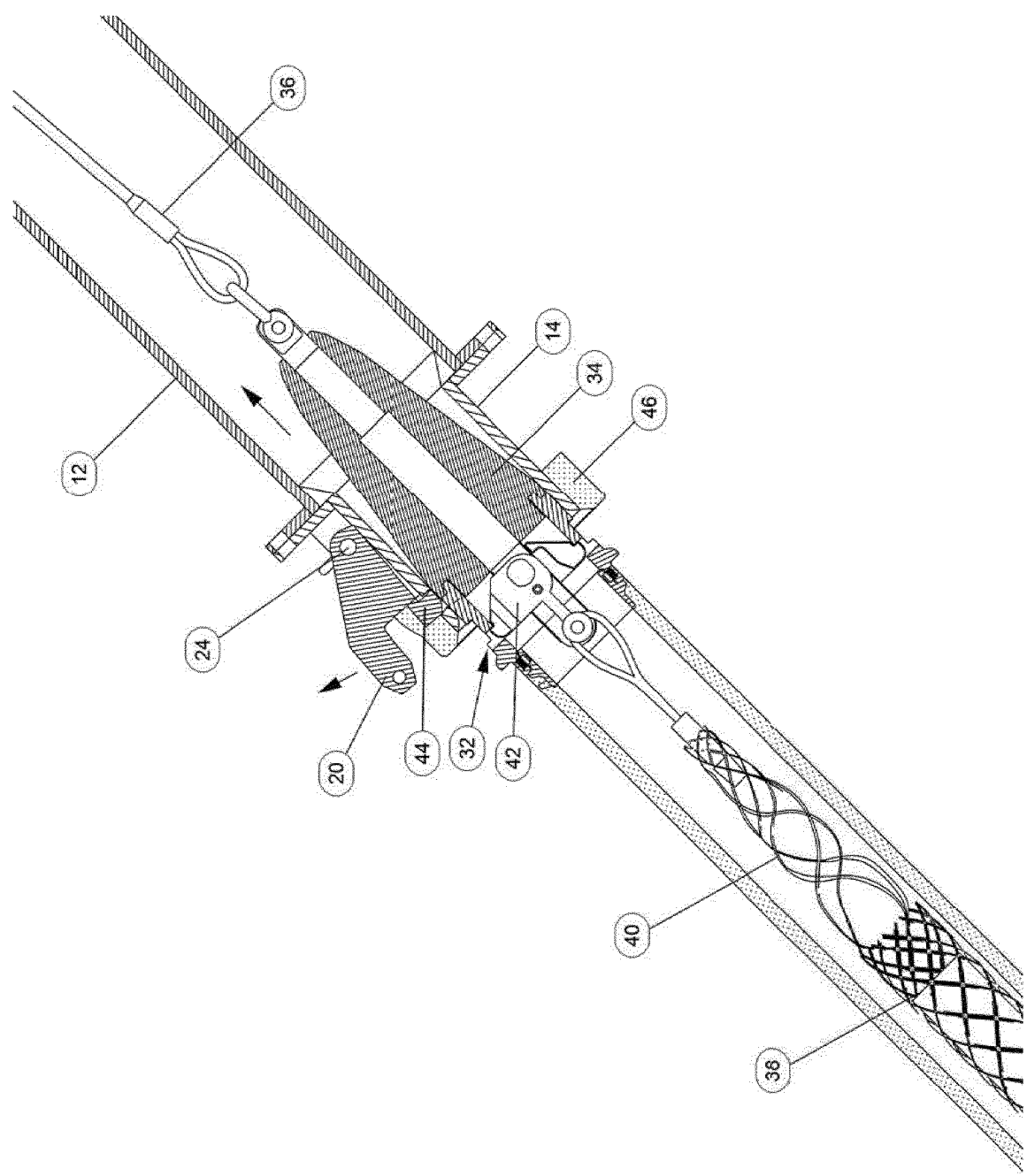
FIG. 3 is cross sectional view showing the pull-in head upwardly pressing the shoulder member of the rotatable locking arm.
Figure 4:
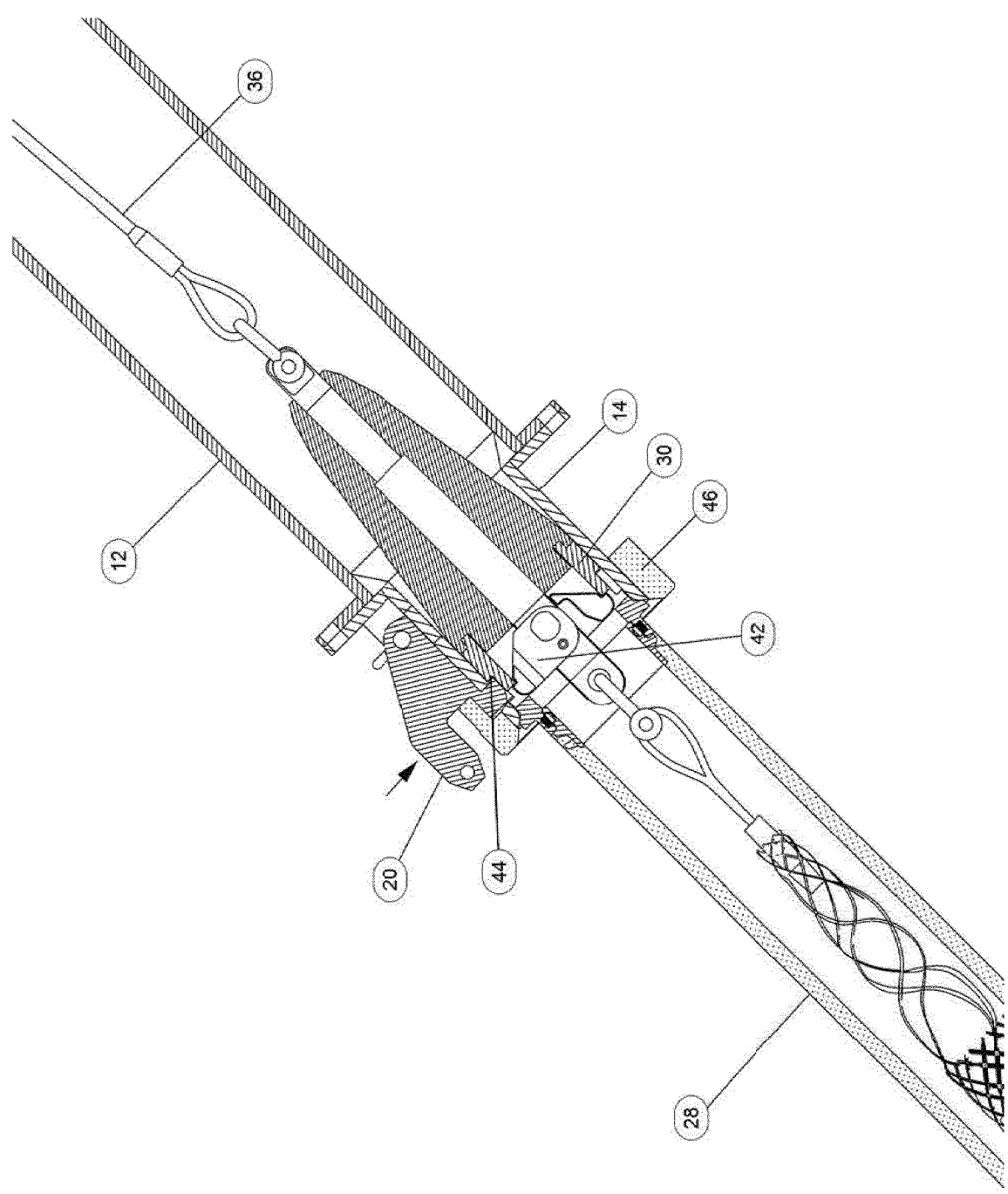
FIG. 4 is a side cross sectional view of the showing the shoulder member in locking engagement with the groove on the connection collar.
Figure 5:
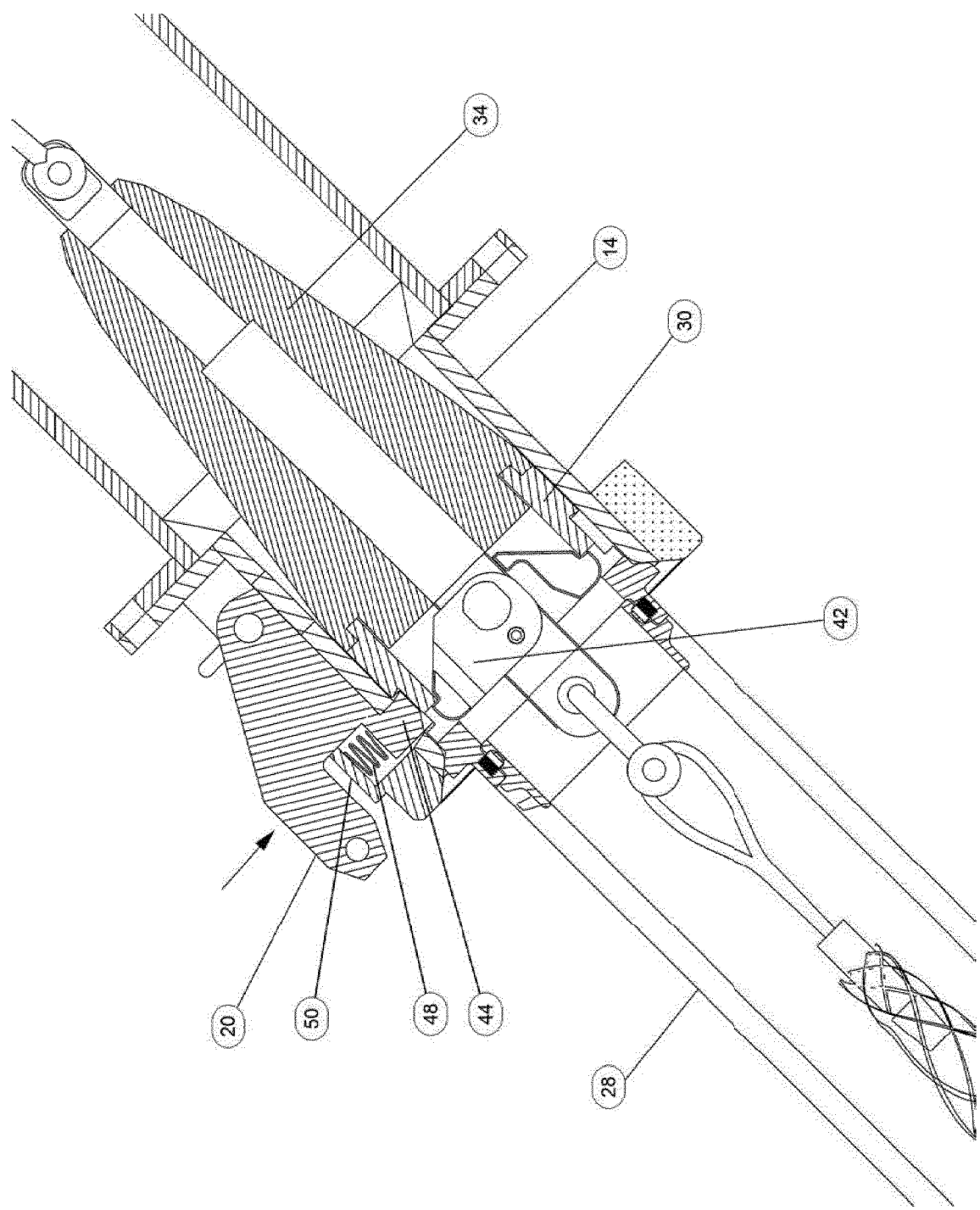
FIG. 5 is a detailed cross sectional view of an alternate embodiment with a spring biasing the rotatable locking arm.

As further shown in FIGS. 2, 3 and 4, rotatable locking arm 20 has a forwardly and downwardly projecting shoulder member 44. Shoulder member projects into the interior of cylindrical opening 18, and is biased in the downward direction. In a first embodiment shown in FIGS. 1-4 and 6-10, the shoulder member 44 is biased downward by an elastomeric collar 46 arranged on the outer surface of cylindrical body 14. The shoulder member 44 is arranged underneath the elastomeric collar 46, the elasticity of which biases the shoulder member downward in the event the rotatable locking arm 20 is rotated upward. FIG. 5 illustrates an alternate embodiment in which rotatable locking arm 20 is biased downward by a spring 48 arranged in a rim 50. As can be appreciated from FIG. 10, shoulder member 44 enters the interior of the cylindrical opening via a gap or passage 52 in cylindrical body 14.

FIGS. 2, 3, 4 (5) and 6 illustrate in sequence the use of the flange device for connecting a conduit to a J-Tube. Pull-in wire 36 pulls pull-in head 34 into the J-Tube 12 via cylindrical opening 18 of essentially cylindrical body 14. The outer surface of pull-in head 34 is arranged to press shoulder member 44 upward against the biasing force provided by elastomeric collar 46. When the pull-in head 34 is further pulled into the flange device 10. Groove 32 will be pulled into alignment with shoulder member 44, as shown sequentially in FIGS. 3 and 4. As shown in FIG. 4, should member 44 is biased downward into locking engagement with groove 32 by elastomeric collar 46, or alternately by the spring arrangement illustrated in FIG. 5.

Figure 6:
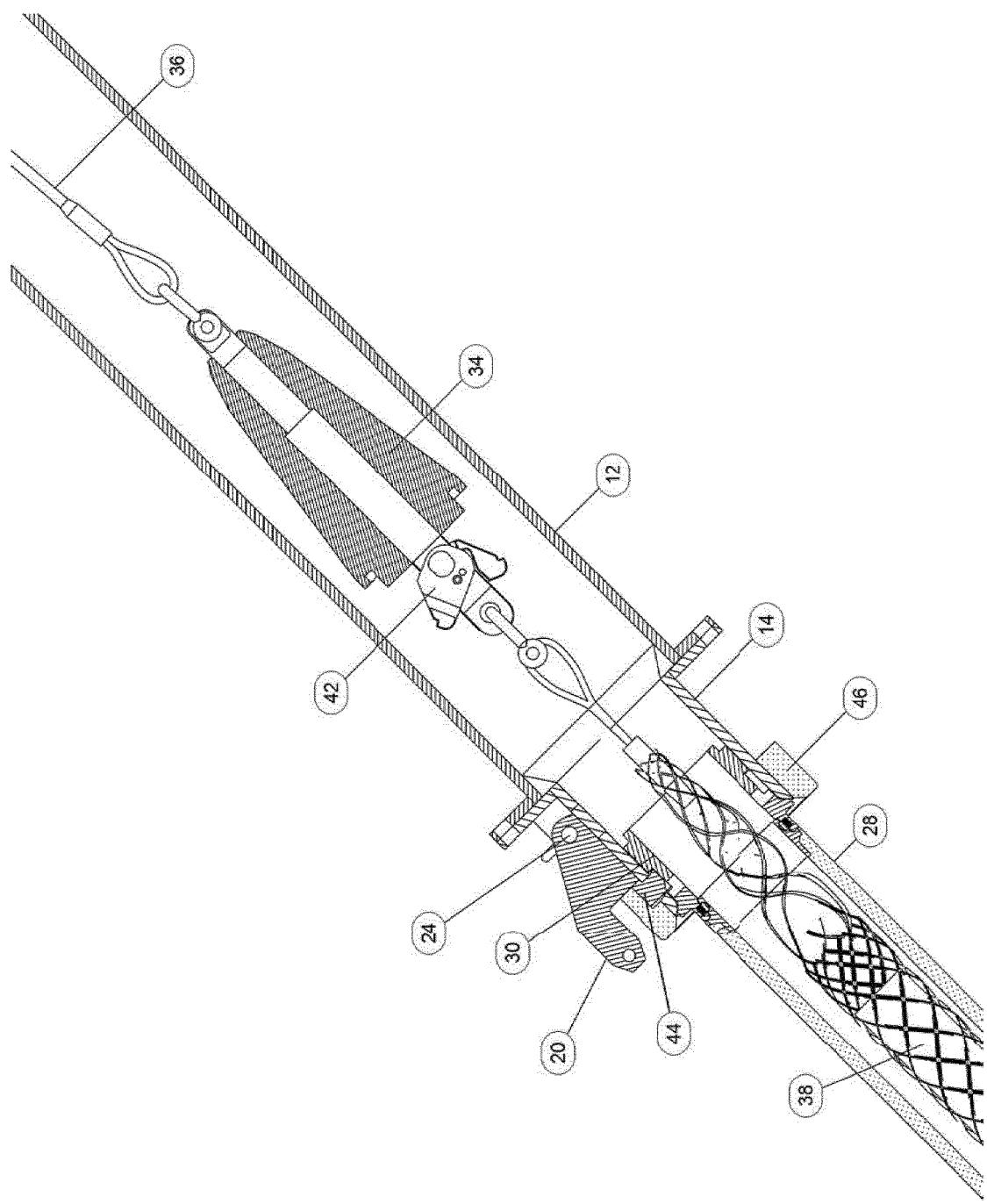
FIG. 6 is a cross sectional view of showing the weak link latch after release, and the internal cable being pulled into the structure.
Figure 7:
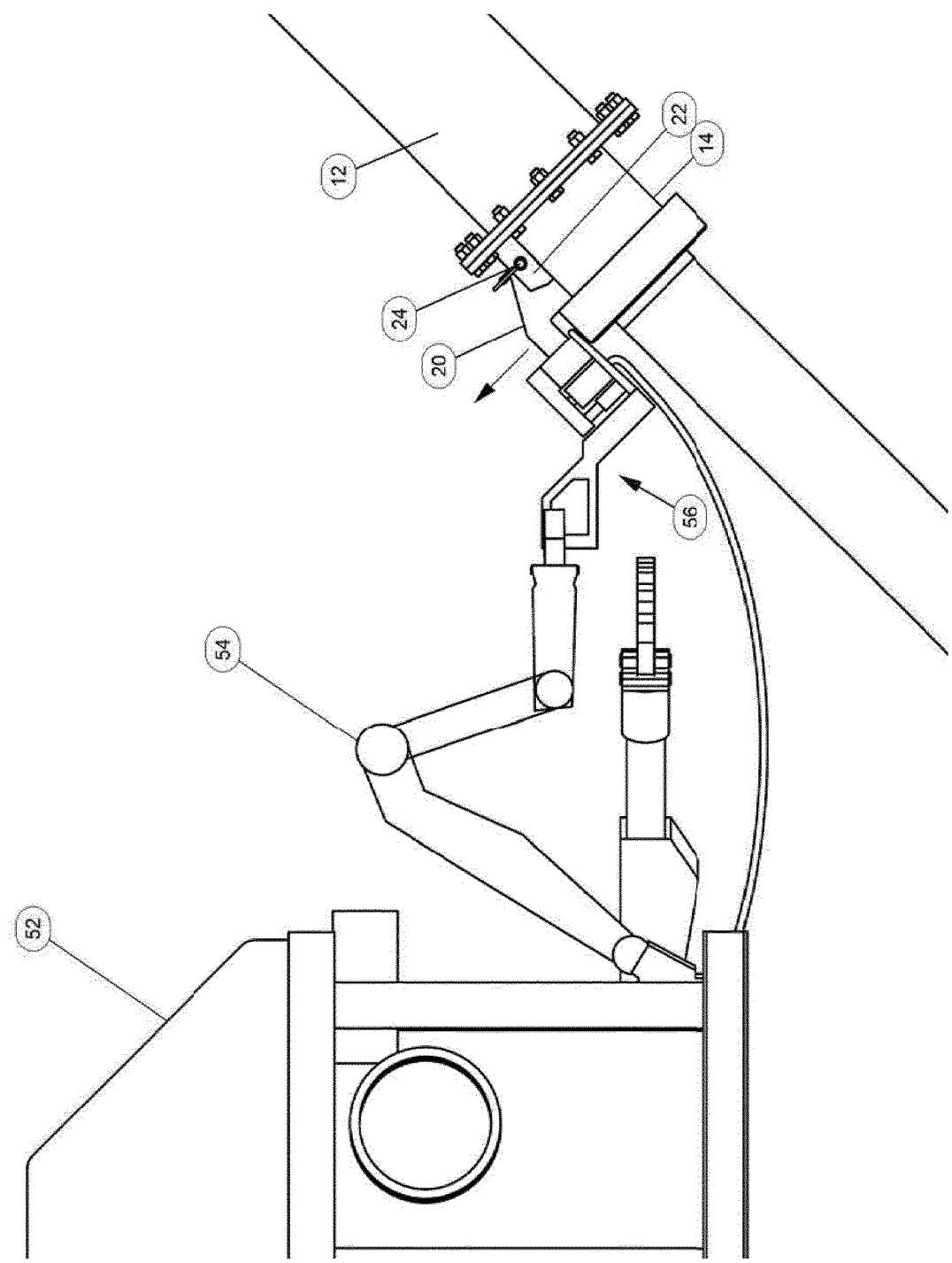
FIG. 7 is a side view of an embodiment of a release mechanism mounted on an ROV.
Figure 8:
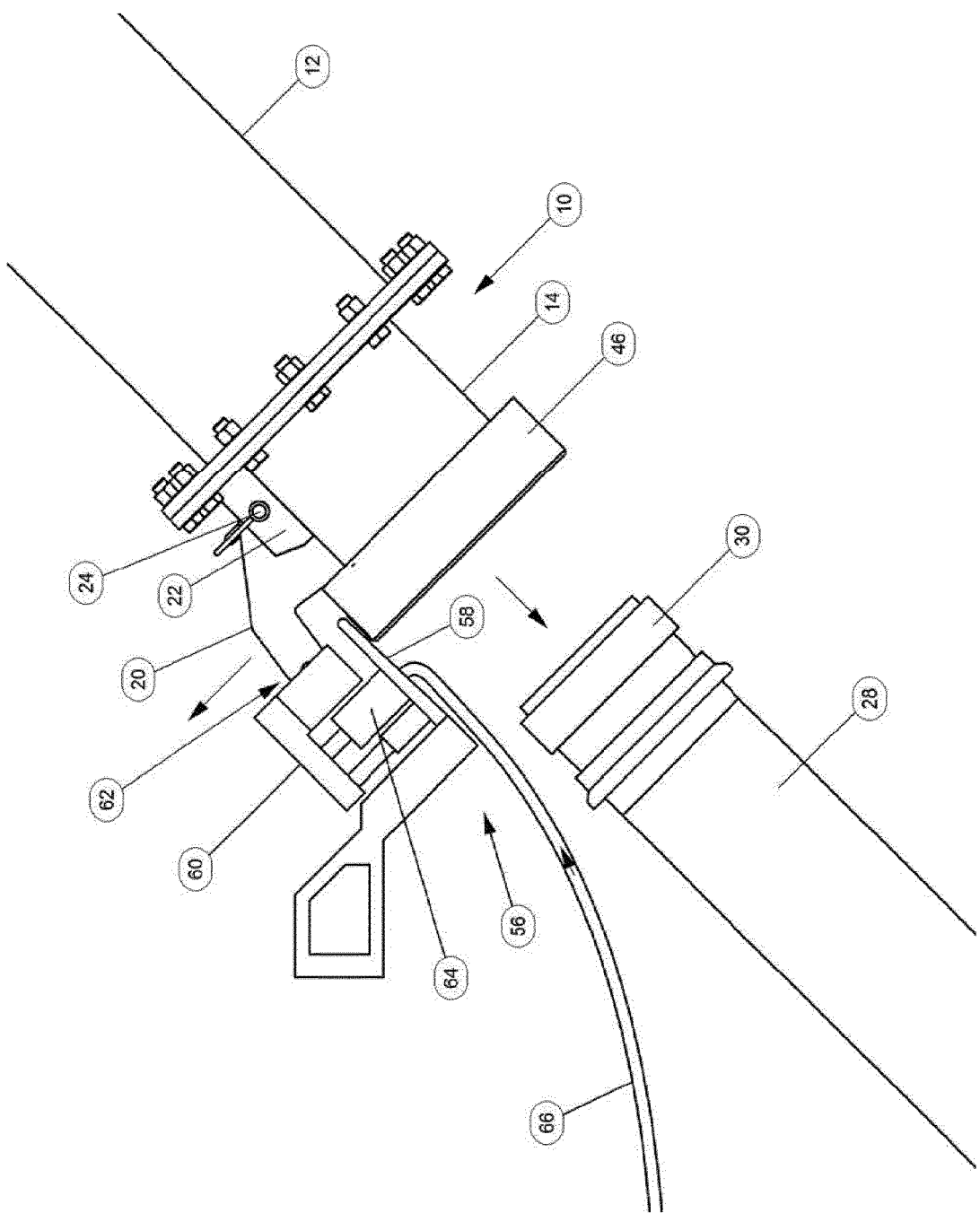
FIG. 8 is a detailed view of the release mechanism from FIG. 7 after release of the connection collar from the flange.
Figure 9:
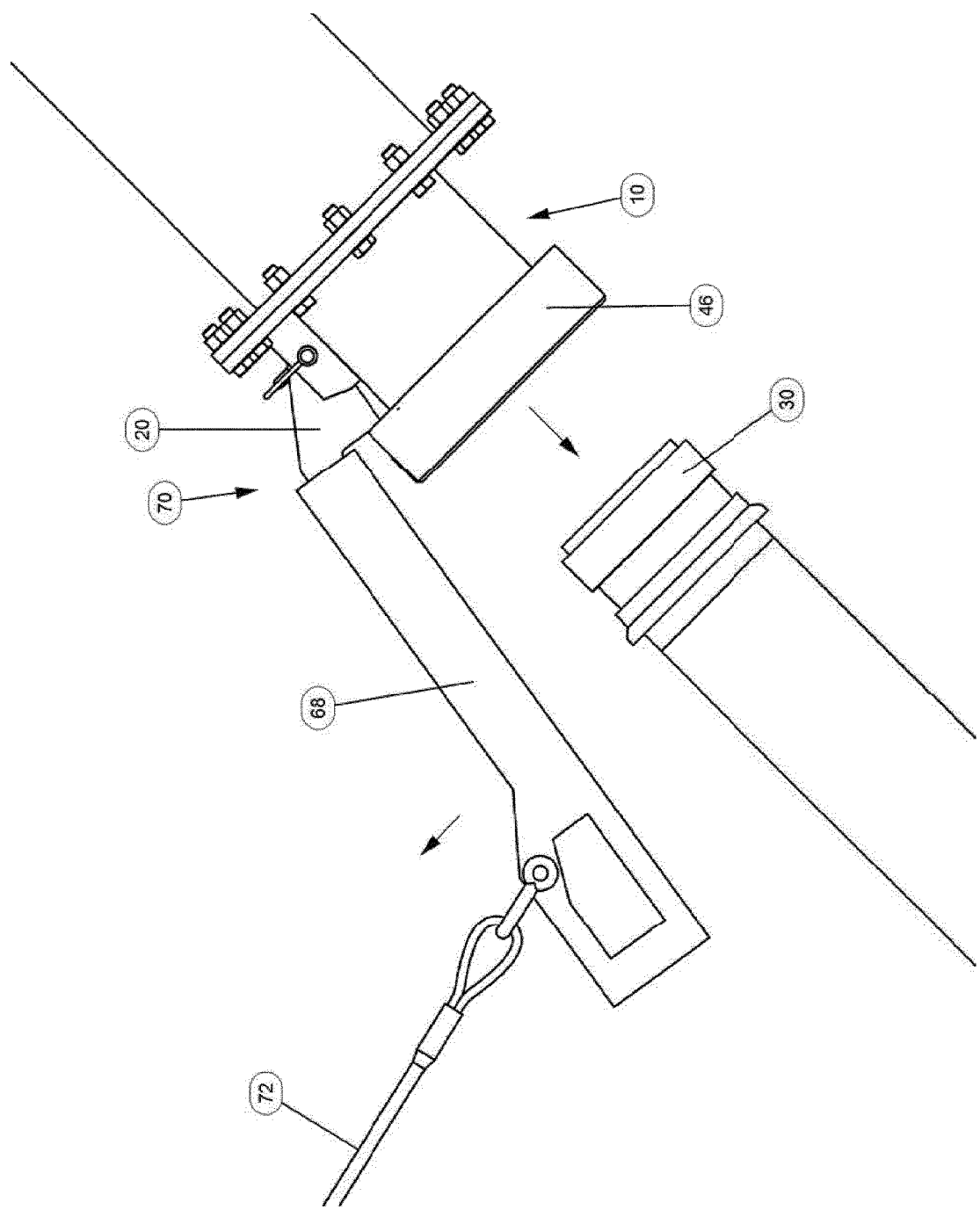
FIG. 9 is a side view of an alternate embodiment of a release mechanism.

As shown in FIG. 6, after the shoulder member 44 locks into engagement with groove 32, the pull-in line 36 is pulled with increasing force until weak link latch 42 disengages from connection collar 30. Cable 38 may then be further pulled into the structure. FIGS. 7 and 8 illustrate a first embodiment of a release mechanism. An ROV 52 having a manipulator arm 54 is equipped with a release device 56. Release device 56 comprises a frame member 58 on which is arranged a vertically movable slider member 60. Slider member 60 has a slot 62 for receiving the end of rotatable locking arm 20. A piston device 64 may be actuated to raise slider member 60, thus raining rotatable locking arm 20 and disengaging shoulder member 44 from groove 32 and releasing collar 30 from the flange device 10. Piston device 64 may be actuated by a hydraulic line 66, or other techniques known in the art for actuating a piston device. In an alternate embodiment shown in FIG. 9, a release arm 68 having a slot 70 is provided. The end of rotatable locking arm is inserted into slot 70. A release line 72 may be pulled in order to rotate arm 20 and disengage collar 30 from the flange device 10.

Figure 10:
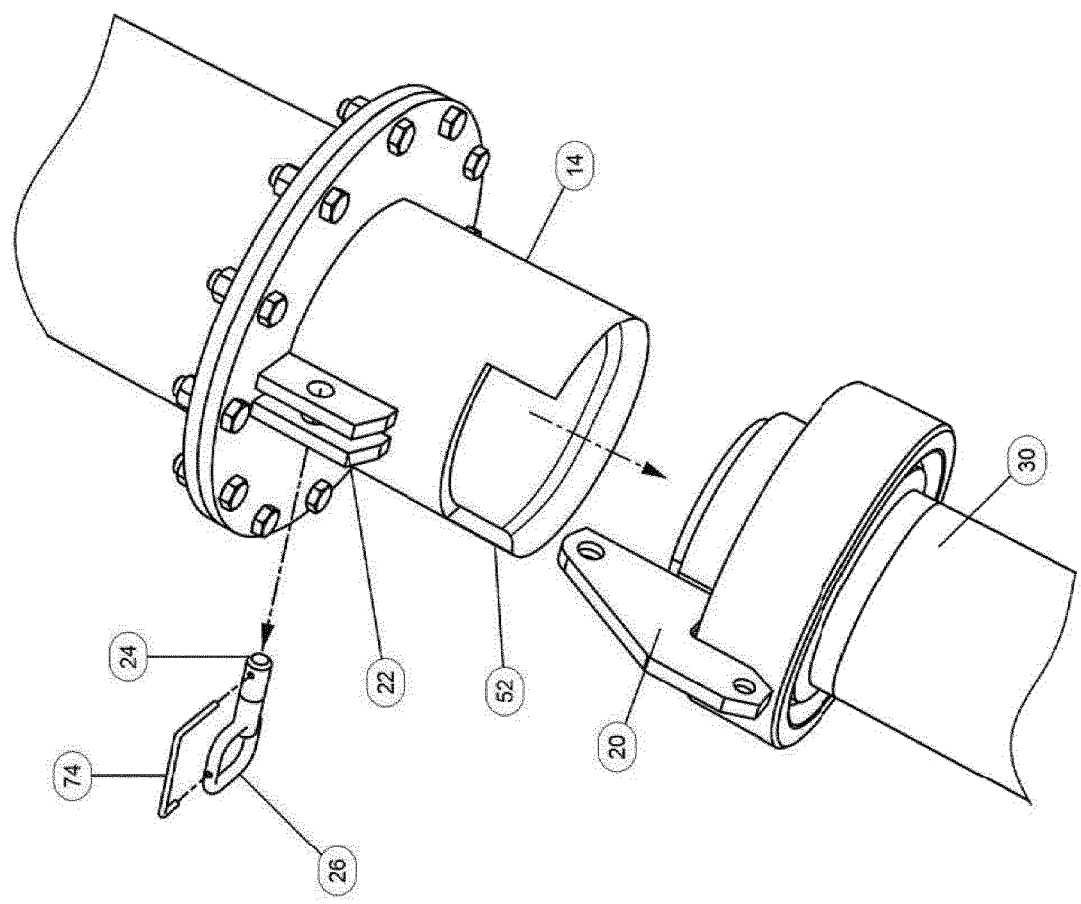
FIG. 10 is a perspective exploded view illustrating the failsafe release mechanism.

In the event the rotatable locking arm 20 becomes jammed, the invention provides a failsafe release mechanism, illustrated in FIG. 10. Hinge pin 24 passes through brackets 22 holding rotatable locking arm 20 in place. A safety pin 74 holds hinge pin 24 in place. Pulling on handle 26 will break safety pin 74, allowing hinge pin 24 to be removed from brackets 22, releasing rotatable locking arm 20. Collar 30, together with the jammed locking arm 20 can then be released from the flange device.

What is claimed is:

1. A quick release cable pull-in system for releaseably connecting a flexible protective outer conduit, in which is internally arranged an elongated cable, to another structure, characterized in that the system comprises:
   a. a flexible protective outer conduit having an elongated cable internally arranged within said flexible protective outer conduit,
   a. a pull-in arrangement at a leading end of the flexible protective outer conduit, said pull-in arrangement comprising a tapered nose piece adapted to be connected to a pull-in line for pulling the elongated cable into a structure, said nose piece being releasably attached to the flexible protective outer conduit and the internal elongated cable by a weak link attachment, said weak link attachment arranged to detach from the flexible protective outer conduit at a lower pulling force than from the elongated cable,
   b. a connection collar attached to the leading end of the flexible protective outer conduit, said connection collar having a recess or groove,
   c. a cylindrical body attached to the structure, the body having a cylindrical opening leading to an interior of the structure adapted for receiving the pull-in arrangement and the connection collar,
   d. a rotatable locking arm attached to the cylindrical body, the arm having a downward projecting shoulder member, said locking arm arranged such that, when in a first lower position the shoulder member extends into the opening a sufficient distance to lockingly engage the recess or groove in the connection collar in the event the pull-in arrangement is pulled into the opening by the pull-in wire,
   e. said arm being biased towards the first lower position by a biasing member.

2. A quick release cable pull-in system according to claim 1, wherein the biasing member is an elastomeric collar arranged about the cylindrical body and over at least a portion of the arm.

3. A quick release cable pull-in system according to claim 2, wherein the plastomeric collar is arranged over the shoulder member.

4. A quick release cable pull-in system according to claim 1, wherein the biasing member is a spring.

5. A quick release cable pull-in system according to claim 1, wherein the arm is connected to the cylindrical body by a release pin.

6. A quick release cable pull-in system according to claim 1, further comprising release means for releasing the conduit from the cylindrical body.

7. A quick release cable pull-in system according to claim 6, wherein the release means is a cable connected to the arm, the upward pulling of which will rotate the arm to a second upper position in which the shoulder member disengages the recess or groove.

8. A quick release cable pull-in system according to claim 7, whereby the tapered nose piece is dimensioned such that the sloped surface of the nose piece, upon being pulled into the cylindrical opening, presses the shoulder member upward from the first lower position, to the second upper position, said shoulder member arranged to be pressed into engagement with the recess or groove by the biasing member when the recess or groove aligns with the shoulder member.

9. A quick release cable pull-in system according to claim 6, wherein the release means is a release device attached to the manipulator arm of an ROV, the lift device comprising a frame member on which is arranged a vertically movable slider member, the slider member having a slot for receiving the arm of the cylindrical body, said slider member being movable in the vertical direction by a hydraulic piston mounted between the frame member and the slider member.

* * * * *

UNITED STATES PATENT AND TRADEMARK OFFICE
CERTIFICATE OF CORRECTION

| | | |
|---|---|---|
| PATENT NO. | : 11,289,886 B2 | Page 1 of 1 |
| APPLICATION NO. | : 16/334223 | |
| DATED | : March 29, 2022 | |
| INVENTOR(S) | : Henrik Bang-Andreasen | |

It is certified that error appears in the above-identified patent and that said Letters Patent is hereby corrected as shown below:

In the Claims

Column 5, Claim 1, Line 30: replace "a." with --b.--
Column 5, Claim 1, Line 40: replace "b." with --c.--
Column 5, Claim 1, Line 43: replace "c." with --d.--
Column 5, Claim 1, Line 47: replace "d." with --e.--
Column 6, Claim 1, Line 7: replace "e." with --f.--
Column 6, Claim 3, Line 14: replace "plastomeric" with --elastomeric--

Signed and Sealed this
Thirtieth Day of August, 2022

*Katherine Kelly Vidal*

Katherine Kelly Vidal
*Director of the United States Patent and Trademark Office*